(12) United States Patent
Wu

(10) Patent No.: US 7,699,475 B2
(45) Date of Patent: Apr. 20, 2010

(54) DEVIATING LIGHT RETRIEVING OPTICAL PROJECTOR SYSTEM

(75) Inventor: Jingmiau Wu, Taipei (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 763 days.

(21) Appl. No.: 11/591,638

(22) Filed: Nov. 2, 2006

(65) Prior Publication Data

US 2008/0106704 A1 May 8, 2008

(30) Foreign Application Priority Data

Jun. 2, 2006 (TW) .............................. 95119654 A

(51) Int. Cl.
*G03B 21/14* (2006.01)
*G03B 21/00* (2006.01)
*G03B 21/20* (2006.01)
*H01J 40/14* (2006.01)

(52) U.S. Cl. .......................... 353/97; 353/122; 353/85; 250/215

(58) Field of Classification Search .................. 353/97, 353/85, 122, 98, 99, 20, 58; 396/162, 172; 348/332, 771; 250/559.05, 215
See application file for complete search history.

(56) References Cited

U.S. PATENT DOCUMENTS 6,467,910 B1  10/2002  Sato

| 6,547,396 | B1  |    4/2003 | Svardal et al.            |
|-----------|-----|-----------|---------------------------|
| 6,561,654 | B2* |    5/2003 | Mukawa et al. ..... 353/31 |
| 6,942,348 | B2* |    9/2005 | Gishi et al. ........ 353/58 |
| 6,953,251 | B2* |   10/2005 | Seki et al. .......... 353/85 |
| 7,052,138 | B2* |    5/2006 | Matsui ............... 353/31 |
| 2003/0179347 | A1* | 9/2003 | Tomiya ................ 353/39 |
| 2004/0189780 | A1* | 9/2004 | Sato .................. 347/118 |
| 2005/0000559 | A1* | 1/2005 | Horio et al. ......... 136/205 |
| 2006/0065296 | A1  | 3/2006 | Chien et al.               |

FOREIGN PATENT DOCUMENTS

| CN | 1755516 A    |   | 4/2006 |
|----|--------------|---|--------|
| JP | 06160851 A   | * | 6/1994 |
| JP | 06175128 A   | * | 6/1994 |
| JP | 08136881 A   | * | 5/1996 |
| TW | 200609653    |   | 3/2006 |

* cited by examiner

*Primary Examiner*—Georgia Y Epps
*Assistant Examiner*—Ryan Howard
(74) *Attorney, Agent, or Firm*—Zhigang Ma

(57) ABSTRACT

An optical projector system is provided. The optical projector system includes light source device, an optical system, a lens set, and a photoelectric conversion device. The optical system has a light entrance end corresponding to the light source device and a light exit end corresponding to the lens set. The light source device includes a light source and a hood enclosing the light source. The light source device, the optical system, and the lens set together form a light passage. The photoelectric conversion device is disposed on a deviating light zone outside the hood for receiving the light deviating from the light passage.

14 Claims, 9 Drawing Sheets

DEVIATING LIGHT RETRIEVING OPTICAL PROJECTOR SYSTEM

BACKGROUND OF THE INVENTION

1. Field of the Invention

The present invention relates generally to an optical projector system. More particularly, the present invention relates to an optical projector being of capable of recycling and reusing the deviating light.

2. Description of the Prior Art

In large size image output equipments, the projector is one of the important image output equipments hard to be substituted. Currently, the principle technique of the projector utilizes light bulb to generate light source and uses modulated device, such as Liquid Crystal Display (LCD) panel, Digital Micro-Mirror Device Chip (DMD Chip), or Liquid Crystal on Silicon (LCOS), to control the generated image. The light bulb is used to increase the illumination in order to enhance the integrated illumination of the outputted image of the projector. Because the power consumption and the limited lifetime of the light bulb have to be considered, it is impossible to unlimitedly increase the current flow to enhance the illumination of the light bulb. Therefore, how to efficiently utilize the light emitted from the light bulb is a big issue in design of the projector.

FIG. 1a is a system view shown a LCD projector of the prior art. As shown in FIG. 1a, the LCD projector includes a light source 10, an optical engine 30, an image controlled device 20 and a lens set 50. The light bulb 11 and the reflector 13 of the light source 10 generate parallel light and output it to the optical engine 30. There are a plurality of different optical components, such as integrator 35, Polarized Beam Splitter (PBS) array 37 and condenser lens 38, included in the optical engine 30. The main purpose of the optical engineer 30 is to organize and equalize the output light and transmit the output light to the image controlled device 20. The image controlled device 20 includes a LCD panel and some optical components used to split or gather light. The output light is amplified by the lens set 50 and reflected on the screen 40 to show the images.

However, in this kind of the projector system, the light generated by the light source 10 is not all parallel light and the hood 15 can not prevent all the light from being transmitted to somewhere else instead of the optical engine 30. Some of the light is scattering from a gap between the hood 15 and the optical engine 30. Moreover, some of incident light will be scattering instead of entering to the next optical component because of the irregular of the light. The deviating light of the optical engine 30 was formed and the consumption of the power was increased.

FIG. 1b is a system view shown the Digital Light Processing (DLP) of the prior art. As shown in FIG. 1b, the Digital Micro-Mirror Device Chip (DMD Chip) disposed in the back end of the optical engine 30 reflects the light of the optical engine 30 to a lens set 50. In order to control the formation of the image, the pixel reflective mirror on the DMD Chip 21 is deviated and the output light of the light source 10 is optionally reflected to the lens set 50 or the deviating reflective zone. When the DMD Chip 21 is going to deviate and the light is reflected to the deviating reflective zone, it is represented that the pixel in the image is a dark spot. Because the light reflected to the deviating reflective zone will not be returned to the optical system, the usage of the light is not efficiency and the power is wasted.

SUMMARY OF THE INVENTION

It is an object of the present invention to provide an optical projector system being to reuse the deviating light.

It is another object of the present invention to provide an optical projector system to increase the efficiency of the usage of the light.

It is a further object of the present invention to provide an optical projector system to generate additional power.

The optical projector system of the present invention includes a light source device, an optical system, a lens set and a photoelectric conversion device. The optical system includes a light entrance end and a light exit end. The light entrance end of the optical system is corresponding to the light source device and the light exit end of the optical system is corresponding to the lens set. The light source device includes a light source and a hood disposed outside of the light source. The photoelectric conversion device is disposed in the deviating light zone outside the hood of the light source.

The photoelectric conversion device is disposed in a position corresponding to a gap between the hood and the optical system. However, in a different embodiment, the photoelectric conversion devices can be formed a ring-like structure and is circled around the light entrance end of the optical system. Besides, the photoelectric conversion device is disposed in a position corresponding to a gap between the optical components of the optical system and used to receive the scattering light.

In another embodiment, the image controlled device disposed in the light exit end of the optical system includes a light reflective device. The photoelectric conversion device is disposed behind the light exit end of the optical system and is in a position corresponding to the deviating reflective zone of the light reflective device. In order to control the image forming, the pixel reflective mirror of the light reflective device will deviate and the output light of the optical system will reflect to the lens set or the deviating reflective zone. When one of the reflective mirrors of the light reflective device will reflect the light to the lens set, it is represented that the pixel formed in the image of the screen is a bright spot. When the light reflective device deviates and the light is reflected to the deviating reflective zone, it is represented that the pixel is a dark spot. At that time, the light reflected to the deviating reflective zone is absorbed by the photoelectric device and transformed into energy.

DETAILED DESCRIPTION OF THE PREFERRED EMBODIMENT

An optical projector system is disclosed in the present invention. The function of the optical projector system is to recycle and reuse the deviating light. In a preferred embodiment, the optical projector system is a projector. The projector disclosed herein is a penetrated projector, a reflective projector or any other kind of projector. The penetrated projector is a Liquid Crystal Display (LCD) projector. The reflective projector is a Digital Light Processing (DLP) and a Liquid Crystal on Silicon (LCOS) projector.

Figure 1A:
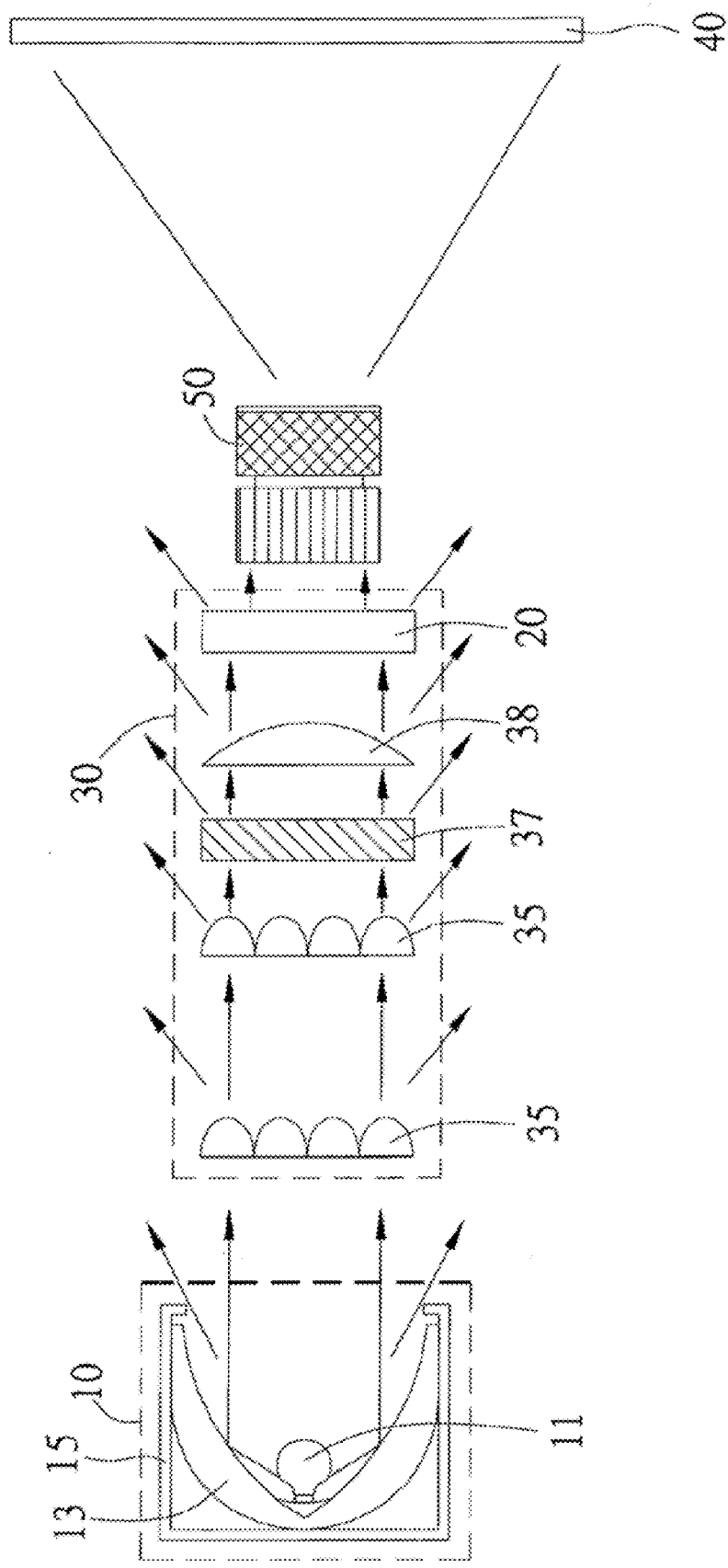
FIG. 1a is a system view of a liquid crystal display (LCD) projector of the prior art.
Figure 1B:
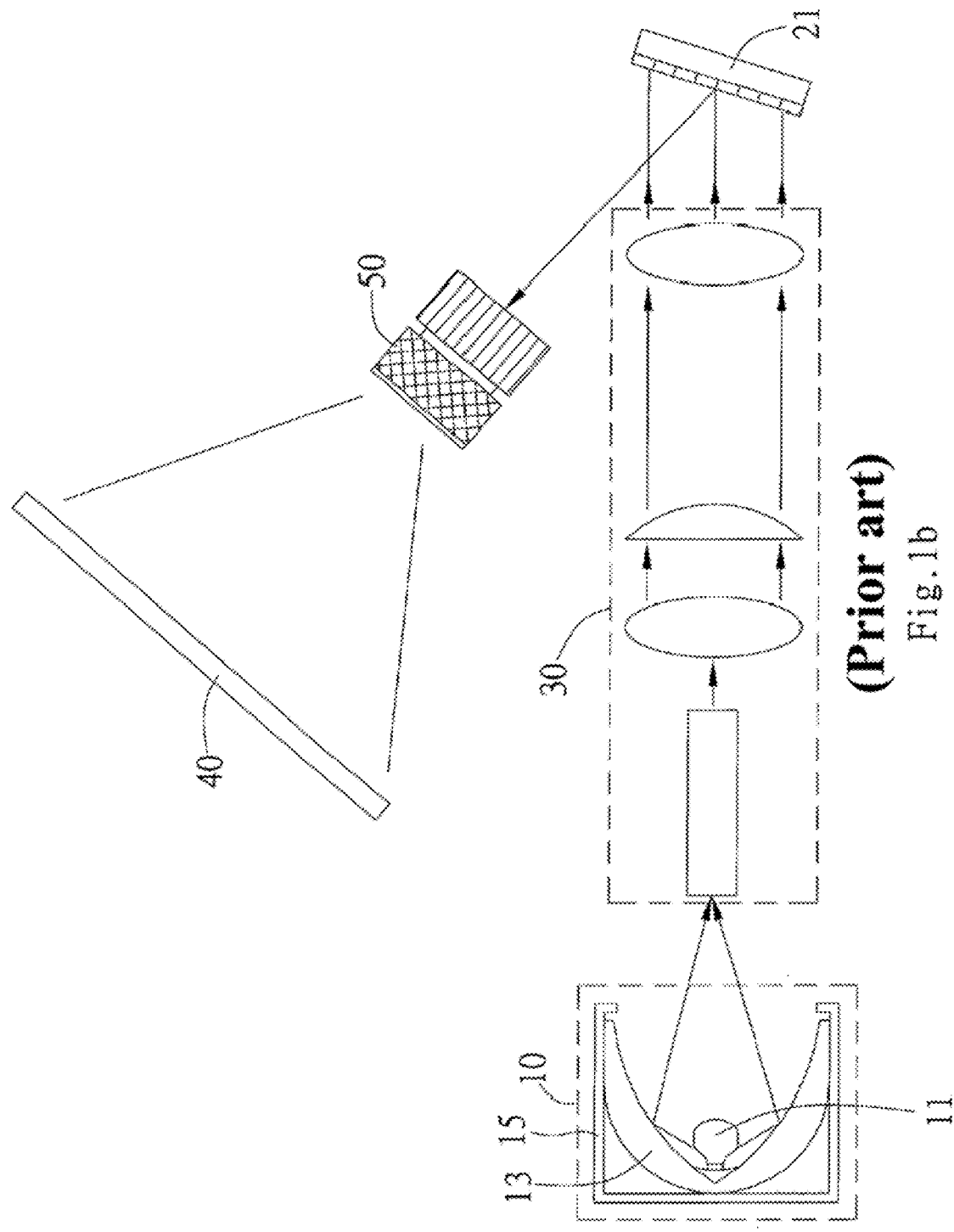
FIG. 1b is a system view of a digital light Processing (DLP) of the prior art.
Figure 2:
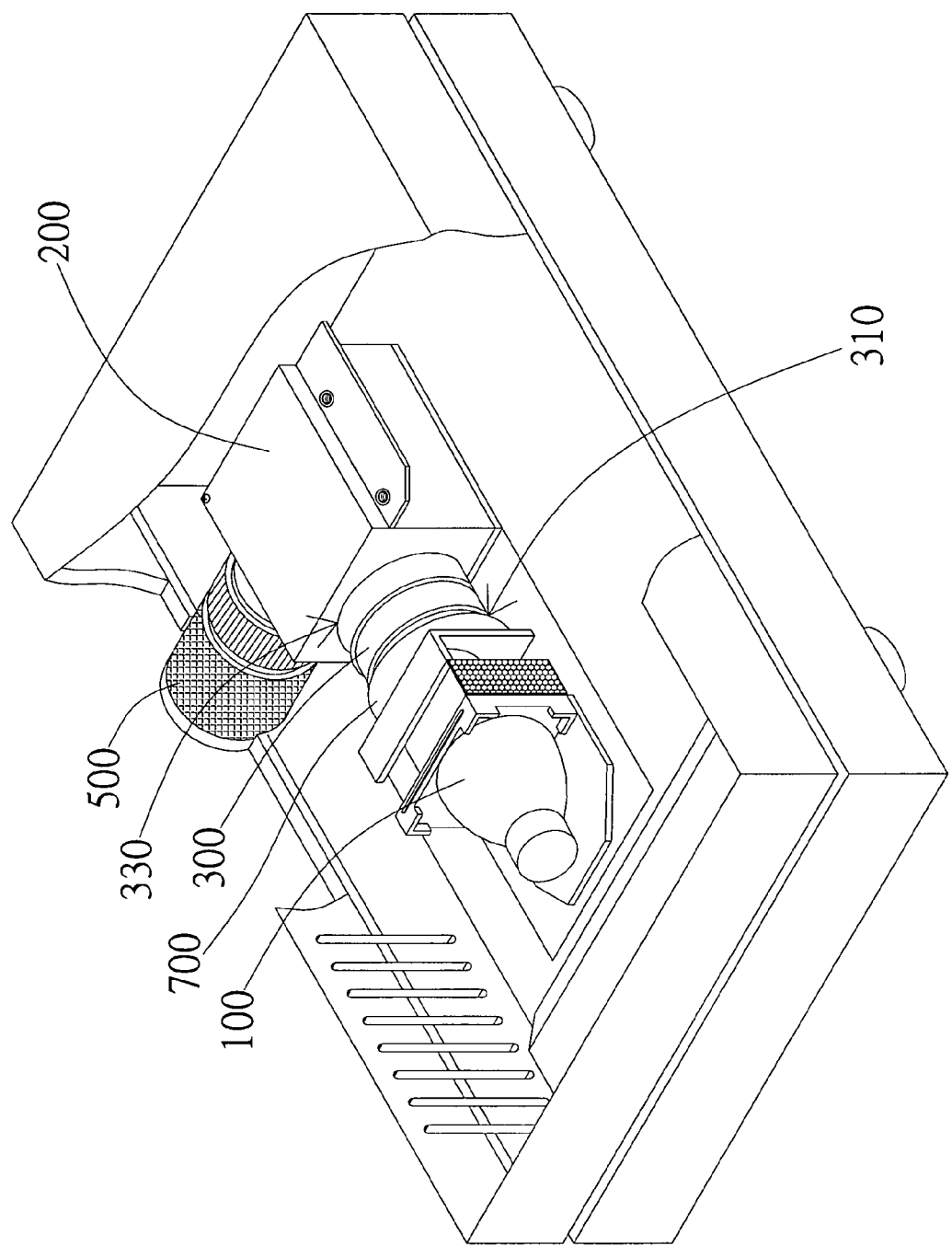
FIG. 2 shows an embodiment of the optical projector system of the present invention.

The optical projector system of the present invention includes a light source device 100, an optical system 300, a lens set 500 and a photoelectric conversion device 700. The preferred embodiment as shown in FIG. 2, the optical system 300 includes a light entrance end 310 and a light exit end 330. The light entrance end 310 of the optical system 300 is corresponding to the light source device 100. The light exit end 330 of the optical system 300 is corresponding to the lens set 500. When the light generated by the light source device 100 is passing to the optical system 300 for condensing, scattering and other optical procedures, the light is entering to the image controlled device 200 of the light exit end 330. In a preferred embodiment, the image controlled device 200 includes a LCD panel or a Digital Micro-Mirror Device Chip (DMD Chip). The light processed by the image controlled device 200 is emitted to the lens set 500 and formed the image by the lens set on the projector screen 400.

The photoelectric device 700 is disposed in the deviating light zone of the light passage formed by the light source device 100, the optical system 300 and the lens set 500. The deviating light zone is existed among the light source device 100, the optical system 300, and lens set 500, or among the optical components of the optical system 300, or the position where the deviating light generated.

Figure 3:
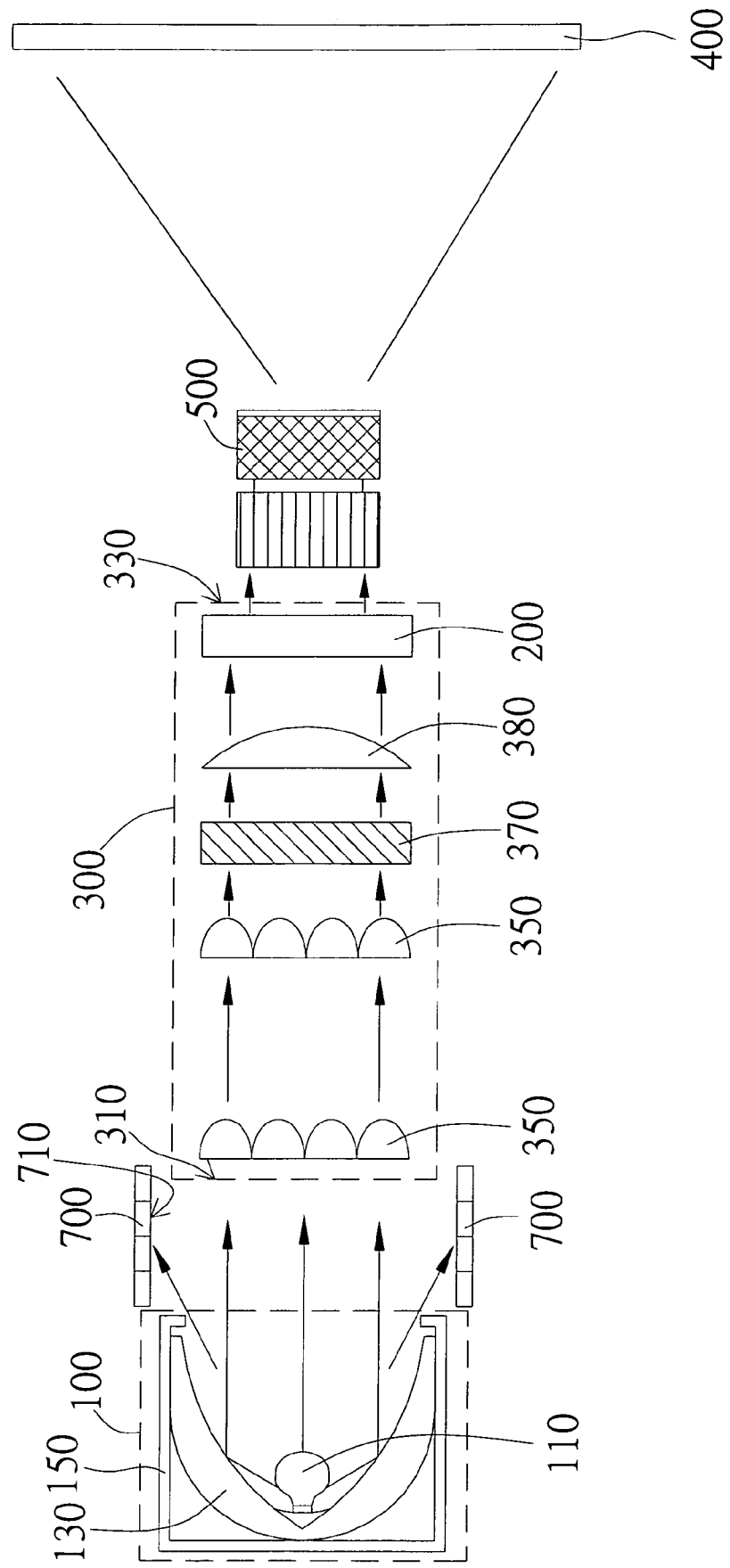
FIG. 3 is a cross-sectional view of a photoelectric conversion system disposed between a hood and an optical system.

FIG. 3 is a cross-sectional view of the preferred embodiment of the present invention. As shown in FIG. 3, the light source device 100 includes a light source 110, a reflector 130 and a hood 150. The light source is preferred to be a light bulb, a halogen bulb, a metal halide bulb or an ultra high pressure (UHP) bulb. The light source 110 is disposed within the reflector 130 and the hood 150 is disposed outside of the reflector 130. In this embodiment, light source device 100 is a parallel light source device; i.e. most of the output light from light source device 100 is parallel. Some of the light generated by the light source 110 is emitted to the light entrance end 310 of the optical system 300 directly and the rest of the light scattering to other directions is reflected by the reflector 130 and moved parallel to the light entrance end 310. The hood 150 is used to block most of the light scattering without entering to the light entrance end 310 of the optical system 300.

In this embodiment, the optical system 300 includes an integrator 350, a polarized beam splitter (PBS) array 370, and a condenser lens 380. The integrator 350 is used to reorganize the incident light and equalize the optical energy. The PBS array 370 converts the P-polarization of the light emitted from the integrator 350 to the S-polarization and increases the efficiency of the light usage. The function of the condenser lens 380 is used to maintain the convergence of the light path and the optical energy can be transmitted in parallel direction.

The light exit end 330 of the optical system 300 includes an image controlled device 200. In this embodiment, the image controlled device 200 includes a LCD panel and some optical components used for light condensing and scattering. Because the optical components and scattering and the LCD panel are coordinated with each other, the signal of each of the pixel on the LCD panel can be changed to control the image of the emitted light. The image controlled device 200 outputs the light with image and the light is immediately entered to the lens set 500. The light was amplified to output on the screen 400.

It should be noted that the light source device 100, the optical system 300 and the lens set 500 formed together to be a light passage is a straight design in FIG. 3. The integrated design of the optical projector system can change the light passage to be any different shapes by utilizing some refractors or any other optical components.

The photoelectric conversion device 700 is disposed outside the hood 150 and is in the deviating light zone of the system. As shown in the embodiment of FIG. 3, the photoelectric conversion device 700 is disposed between the hood 150 and the light entrance end 310 of the optical system 300. The photoelectric conversion device 700 includes a receiving surface 710 parallel to the direction of the movement of the light in the optical system 300. As shown in FIG. 3, the photoelectric conversion device 700 is disposed outside the light passage. The photoelectric conversion devices 700 are respectively disposed in the top and the bottom of the hood 150. The photoelectric conversion devices 700 can also be disposed in a ring-like structure and are circled around the whole hood 150 or are in the outside of the light entrance end 310 of the optical system 300.

The photoelectric conversion device 700 is preferred to be a solar array. However, in the different embodiment, the photoelectric conversion device 700 can be a device used to convert the optical energy into electric energy. When the light generated by the light source device 100 directly is emitted or passed to the reflector 130 and indirectly emitted from the light source device 100, most of the light not emitted to the optical system 300 was blocked by the hood 150. However, there was some of the light not emitted to the optical system 300 not block by the hood 150 and the light was absorbed by the photoelectric device 700. On the other hand, because the light generated by the light source device 100 is not parallel light and the hood 150 cannot block all the light not emitted to the optical system 300. There is some of the light emitted to the photoelectric conversion device 700 from the hood 150 and the optical system 700.

Figure 4:
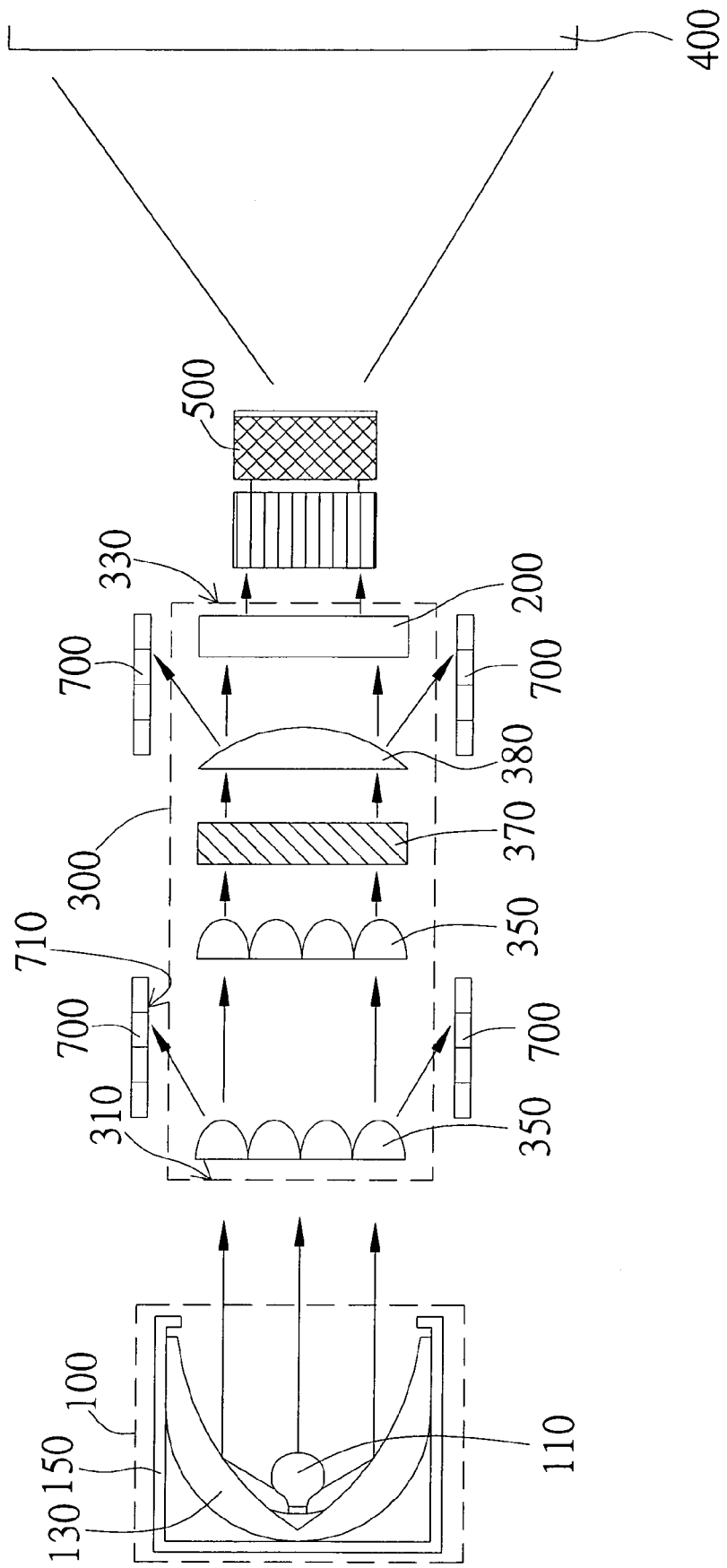
FIG. 4 is a cross-sectional view of a photoelectric conversion system disposed in a position corresponding to a gap between each of optical components of an optical system.

In the embodiment of FIG. 4, the photoelectric conversion device 700 is disposed in a position corresponding to a gap among each of the optical components of the optical system 300. The optical component is an integrator 350, a PBS array 370, a condenser lens 380 and so on. Because of the irregular of the incident light, some of the light emitted to the optical component will be scattered without entering to the next optical component and formed a deviating light of the optical system 300. At this situation, the deviating light scattered from the optical system 300 is absorbed by the photoelectric conversion device 700 and transformed into electric energy.

Figure 5:
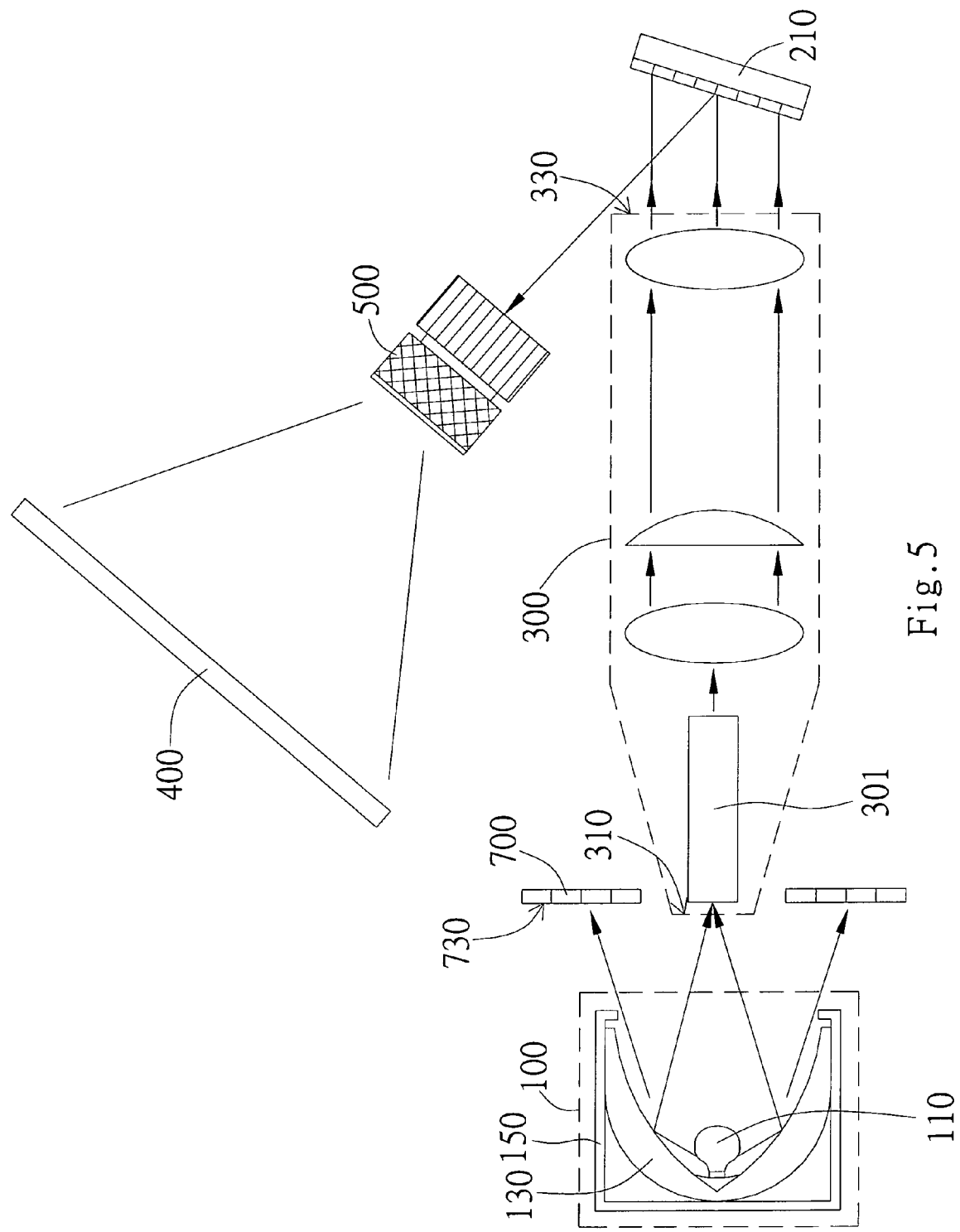
FIG. 5 is a cross-sectional view of an embodiment of the photoelectric conversion device circled around a light entrance end of the optical system.

As shown in the embodiment of FIG. 5, the optical system 300 includes a light pipe 301. The active area of the light entrance end of the light pipe 301 is smaller than the active area of the optical system 300 of the mentioned embodiment. In order to cooperate with light pipe 301, the light source device 100 is a light centralized device. The light centralized device 100 is able to focus the output light of the light source device 100 on a specific point. On the other hand, the light entrance end of the light pipe 301 is disposed in the focused position of the light generated in the light source device 100 in order to receive the light of the light source device 100.

Besides, in this embodiment, the image controlled device 300 disposed in the light exit end 330 of the optical system includes a light reflective device 210. In a preferred embodiment, the light reflective device 210 includes a Digital Micro-Mirror Device Chip (DMD Chip). The light reflective device 210 reflects the light of the optical system 300 to the lens set 500 and is used to control the image formed on the screen 400.

As shown in FIG. 5, the photoelectric device 700 is formed and circled around the ring-like structure of the light entrance end 310 of the optical system 300. The photoelectric conversion device 700 includes a ring-like receiving surface opposite to the light source device 100. As shown in the preferred embodiment of FIG. 4, the ring-like receiving surface 730 is vertical to the direction of the light of the light pipe 301. However, in different embodiment, the included angle of the ring-like receiving surface 730 and the light direction of the light pipe 301 is different for effectively corresponding to the light source device 100

Figure 6:
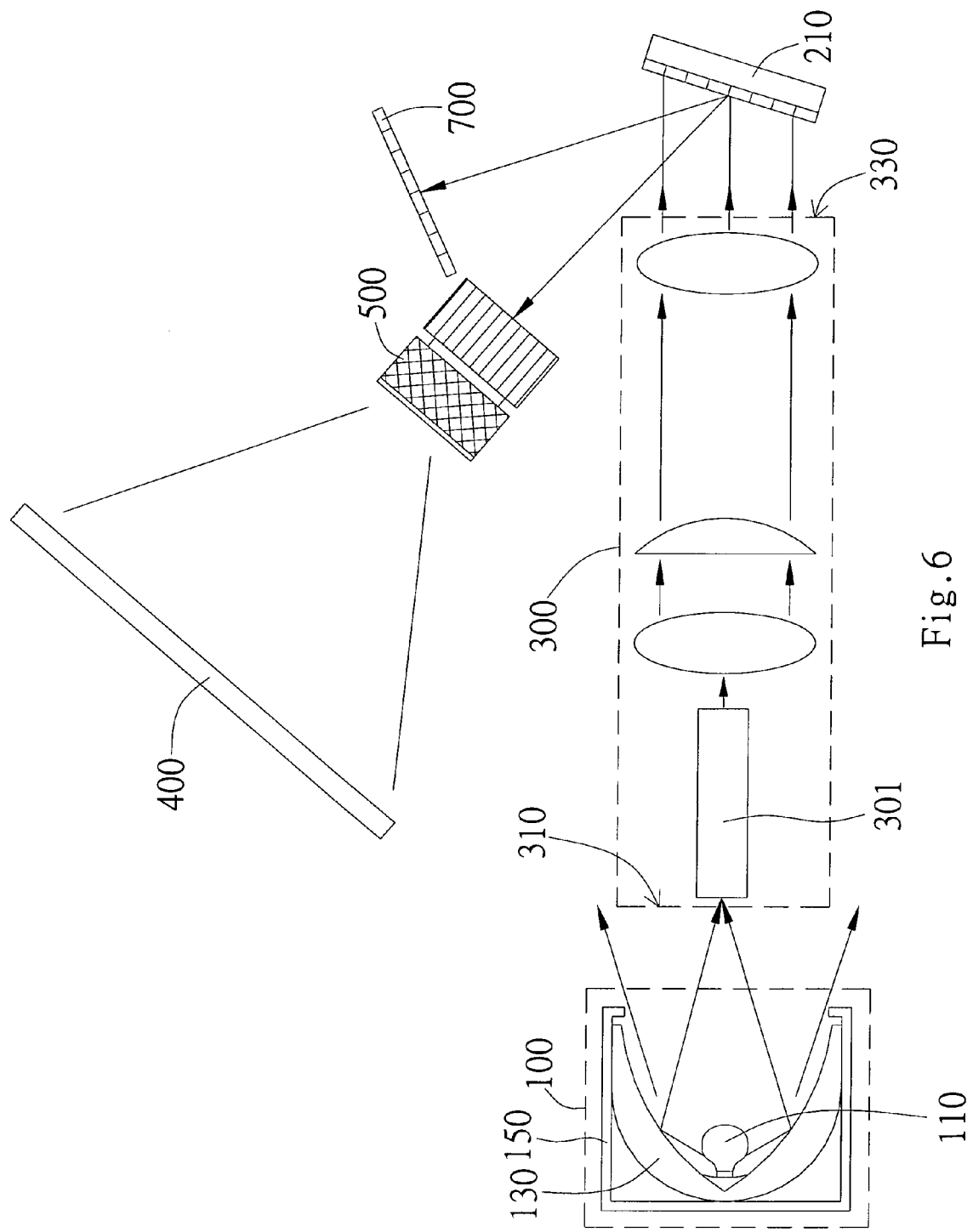
FIG. 6 is a cross-sectional view of an embodiment of the photoelectric conversion device disposed in a deviating reflective zone of a light reflective device.

The light source device 100, the optical system 300, the image controlled device 200 and the lens set 500 in the embodiment of FIG. 6 have the same deployment as the embodiment of FIG. 5. In this embodiment, the photoelectric conversion device 700 is disposed behind the light exit end of the optical system 300 and disposed in the deviating reflective zone corresponding to the light reflective device 210. In order to control the formation of the image, the pixel reflector in the light reflective device 210 will be deviated and optionally reflect the output light of the optical system 300 to the lens set 500 or the deviating reflective zone. When one of the pixel reflectors in the light reflective device 210 reflects the light to the lens set 500, it is represented that the pixel formed in the image of the screen 400 is a bright spot. When the light reflective device 210 will be deviated and the light is reflected to the deviating reflective zone, it is represented that the pixel in the image is a dark spot. At the time, the light reflected to the deviating reflective zone is absorbed by the photoelectric conversion device 700 and transformed into electric energy.

Figure 7:
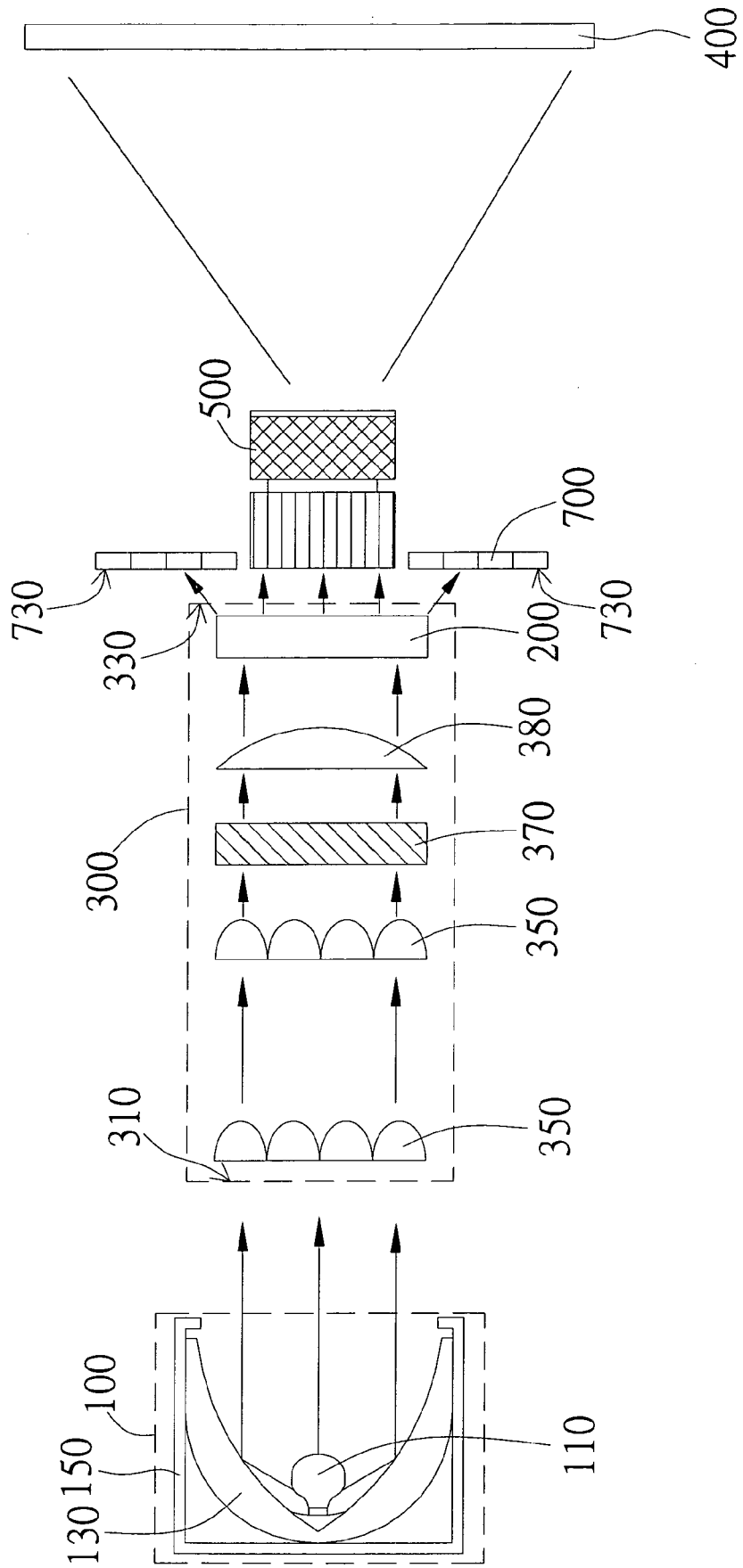
FIG. 7 is a cross-sectional view of an embodiment of the photoelectric conversion device circled around a lens set.

The light source device 100, the optical system 300, the image controlled device 200 and the lens set 500 in the embodiment of FIG. 7 have the same deployment as the embodiment of FIG. 3. However, in this embodiment, the photoelectric conversion device 700 is disposed behind the light exit end 330 of the optical system 300. The photoelectric conversion device 700 is formed and circled around the ring-like structure of the light entrance end of the lens set 500. The photoelectric conversion device 700 includes a ring-like receiving surface 730 opposite to the light source device 100. In the embodiment of FIG. 7, the ring-like structure 730 is vertical to the lens set 500. In the different embodiment, the included angle of the ring-like receiving surface 730 and the lens set 500 is different.

Besides, in different embodiments, the photoelectric conversion device 700 is disposed in a position corresponding to a gap disposed between the light exit end 330 of the optical system 300 and the lens set 500 and parallel to the light movement direction between the optical system 300 and lens set 500. The photoelectric conversion device 700 is used to absorb the deviating light deviated between the light exit end 330 of the optical system 300 and the lens set 500 and transformed into electric energy.

Figure 8:
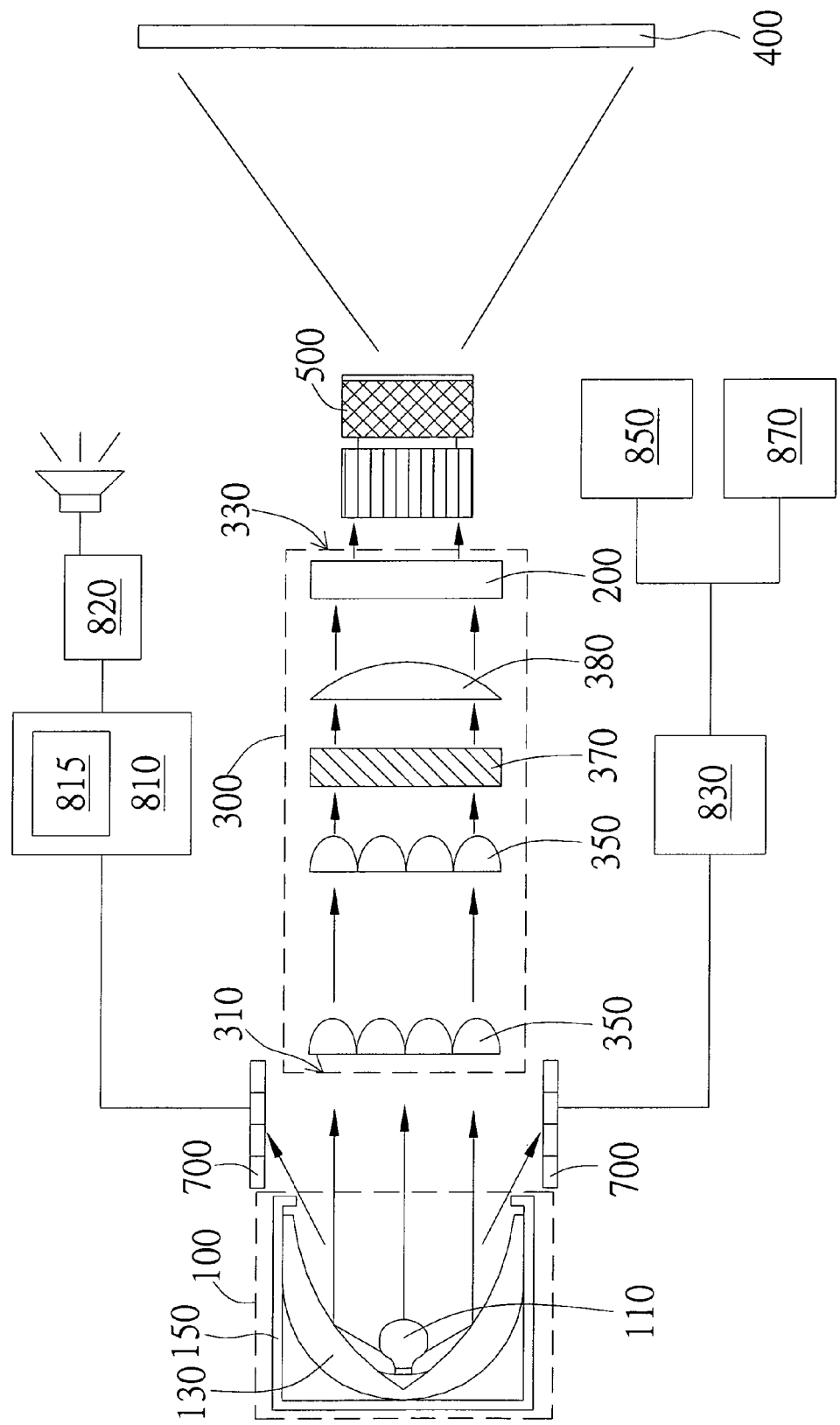
FIG. 8 is a view of another embodiment of the optical projector system.

As shown in FIG. 8, the photoelectric conversion device 700 is electrically connected to a detection circuit 810. The photoelectric conversion device absorbs and transforms the light to the electrical signal. The electrical signal is transmitted to the detection circuit 810. Because of the service time increasing, the light generated and scattered by the light source 110 is increased. The service time of the light source 110 is determined or the rest of the lifetime of the light source 110 is predicted by analyzing or comparing the electrical signal received from the photoelectric conversion device 700.

In the preferred embodiment, the detection circuit 810 includes a light source database 815. The light source database 815 is stored with one or several data related to the light source signals and service time and is used to satisfy the demand of changing different light bulbs. The detection circuit 810 will detect the electrical signals and compare the electrical signals with the signals and service time of the data stored in the light source database 815 to get the correct service time of the light source at present. The detection circuit 810 will further decide the service status of the light source is "good to use" or "need to change" according to the service time compared with the light source database 815. Besides, the detection circuit 810 is electrically connected to a warning device 820. When the detection circuit 810 determines the service status is in "need to change the light source", the detection circuit 810 will output a status signal to the warning device 820. The warning device 820 will output a warning signal according to the status signal. The warning signal described here is a light signal, a color signal, a voice signal, a character signal and so on.

Besides, the photoelectric conversion device 700 can be electrically connected to an energy storage device 830. The optical energy absorbed by the photoelectric conversion device 700 can be transferred into electric energy and stored in the energy storage device 830. The energy storage device 830 can be a battery or any other device used to save electric energy. The energy storage device 830 can also be electrically connected to the power supply 850 disposed inside the optical projector system to provide extra power or electrically connected to a current output interface 870 to provide the output power.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An optical projector system comprising:
    a light source device comprising a light source and a hood, wherein said light source is enclosed by said hood;
    an optical system comprising a light entrance end and a light exit end, wherein said light entrance end is corresponding to said light source device and receiving light emitted from said light source device;
    an lens set corresponding to said light exit end of said optical system and receiving a light emitted from said light exit end, wherein said light source device, said optical system, and said lens set form a light passage; and
    a photoelectric conversion device disposed on a deviating light zone outside said light passage, wherein said photoelectric conversion device is a ring around an optical axis of the light passage.

2. The light projector system of claim 1, wherein said photoelectric conversion is disposed between said hood and said light entrance end of said optical system.

3. The light projector system of claim 1, wherein said photoelectric conversion device includes a receiving surface in parallel with said light passage.

4. The light projector system of claim 1, wherein said photoelectric conversion device comprises a receiving surface opposite to said light source device.

5. The light projector system of claim 1, wherein said photoelectric conversion device is disposed between said light exit end and said lens set.

6. The light projector system of claim 1, wherein said photoelectric conversion devices is circled around said light entrance end of said optical system.

7. The light projector system of claim 1, further comprising a detection circuit electrically connected to said photoelectric conversion device, the detecting circuit comprising a light source database, the light source database storing data related to the light source signals and the service time of the light source, said detection circuit receiving an electric signal of said photoelectric conversion device and comparing the electric signal with the light source signals and the service time to get correct service time of said light source.

8. The optical projector system of claim 1, wherein the optical system comprises at least two optical components between the light entrance end and the light exit end, the photoelectric conversion device is disposed between two of said optical components.

9. The optical projector system of claim 7, further comprising a warning device, the warning device being configured for outputting a warning signal when the detection circuit determines light source should be replaced.

10. The optical projector system of claim 9, wherein the warning signal is selected from the group consisting of a light signal, a color signal, a voice signal, and a character signal.

11. The optical projector system of claim 1, further comprising an energy storage device, the energy storage device being configured for storing electrical energy converted from optical energy absorbed by the photoelectric conversion device.

12. The optical projector system of claim 11, wherein the energy storage device comprises a battery.

13. The optical projector system of claim 12, further comprising a power supply, the power supply being disposed inside the optical projector system to provide extra power, the energy storage device being electrically connected to the power supply.

14. The optical projector system of claim 12, further comprising a current output interface, the current output interface being configured to provide the output power, the energy storage device being electrically connected to the current output interface.

* * * * *